(12) United States Patent
Gomez et al.

(10) Patent No.: US 9,417,731 B2
(45) Date of Patent: Aug. 16, 2016

(54) CONTACTLESS USER INTERFACE HAVING ORGANIC SEMICONDUCTOR COMPONENTS

(75) Inventors: Jean-Yves Gomez, Grenoble (FR); Laurent Jamet, Grenoble (FR); Emmanuel Guerineau, Grenoble (FR); Christophe Premont, Grenoble (FR)

(73) Assignees: ISORG (FR); COMMISSARIAT L'ENERGIE ATOMIQUE ET AUX ENERGIES ALTERNATIVES (FR)

( * ) Notice: Subject to any disclaimer, the term of this patent is extended or adjusted under 35 U.S.C. 154(b) by 204 days.

(21) Appl. No.: 14/347,986

(22) PCT Filed: Aug. 8, 2012

(86) PCT No.: PCT/FR2012/051864
§ 371 (c)(1),
(2), (4) Date: Jun. 18, 2014

(87) PCT Pub. No.: WO2013/045780
PCT Pub. Date: Apr. 4, 2013

(65) Prior Publication Data
US 2014/0306097 A1    Oct. 16, 2014

(30) Foreign Application Priority Data
Sep. 27, 2011 (FR) .................... 11 58609

(51) Int. Cl.
*G06F 3/042* (2006.01)

(52) U.S. Cl.
CPC ...... *G06F 3/042* (2013.01); *G06F 2203/04101* (2013.01); *G06F 2203/04102* (2013.01); *G06F 2203/04103* (2013.01); *G06F 2203/04104* (2013.01); *G06F 2203/04106* (2013.01)

(58) Field of Classification Search
CPC ............ G06F 2203/04101; G06F 2203/04102; G06F 2203/04103; G06F 2203/04104; G06F 2203/04106; G06F 3/042
See application file for complete search history.

(56) References Cited

U.S. PATENT DOCUMENTS

| | | | |
|---|---|---|---|
| 8,354,666 B2 | 1/2013 | Lee et al. | |
| 2006/0145365 A1 | 7/2006 | Halls et al. | |
| 2007/0287394 A1 | 12/2007 | Swan et al. | |
| 2008/0122798 A1 | 5/2008 | Koshiyama et al. | |
| 2008/0150848 A1* | 6/2008 | Chung ................. | G06F 3/0412 345/82 |
| 2008/0297487 A1 | 12/2008 | Hotelling et al. | |
| 2009/0027371 A1 | 1/2009 | Lin et al. | |
| 2009/0123029 A1 | 5/2009 | Harada et al. | |
| 2009/0237372 A1* | 9/2009 | Kim ....................... | G06F 3/044 345/173 |
| 2010/0067235 A1 | 3/2010 | Yamashita et al. | |
| 2010/0103139 A1 | 4/2010 | Soo et al. | |
| 2010/0283763 A1 | 11/2010 | Kim et al. | |
| 2010/0294936 A1 | 11/2010 | Boberl et al. | |

(Continued)

OTHER PUBLICATIONS non-final Office Action, Dated Apr. 3, 2015, issued in related U.S. Appl. No. 13/569,379.

(Continued)

*Primary Examiner* — Francis M Legasse, Jr.
(74) *Attorney, Agent, or Firm* — Kaplan Breyer Schwarz & Ottesen LLP

(57) ABSTRACT

The invention relates to a tactile or contactless user interface device (50), comprising organic semiconductor components (52) made by depositing organic conducting and semiconducting material in liquid form on a dielectric support (54).

12 Claims, 3 Drawing Sheets

(56) References Cited

U.S. PATENT DOCUMENTS

| | | |
|---|---|---|
| 2010/0295821 A1 | 11/2010 | Chang et al. |
| 2010/0315413 A1 | 12/2010 | Izadi et al. |
| 2011/0175830 A1 | 7/2011 | Miyazawa et al. |
| 2011/0316679 A1 | 12/2011 | Pihlaja |

OTHER PUBLICATIONS

Linh Nguyen Hoffner, Advisory Action, Dated Dec. 24, 2014 issued in related U.S. Appl. No. 13/569,379.

Olivier Pentier, "Isorg rend les surfaces intelligentes (XP002674900)", "Le Dauphine Libere", Sep. 6, 2011, pp. 5-5, Publisher: URL:http://www.isorg.fr/edito/files/isorg_rend_les_surfaces_intelligentes_379449.pdf, Published in: FR.

Cea-Liten, Isorg, "L'electronique organique imprimee : pour une industrie electronique durable qui repond aux nouveaux besoins de societe (XP002674901)", "Dossiers thematiques du SITELESC", Jun. 2011, pp. 12-13, vol. 1, Publisher: www.isorg.fr/edito/files/l_b_lectronique_organique_imprimb_e_pour_une_industrie_b_lectronique_durable_qui_rb_pond_aux_nouveaux_de_socib_tb_478919.pdf, Published in: FR.

Pascal Coutance, "L'avenir appartient a l'electronique imprimee (XP002674911)", "Ce document decrit des caracteristiques du produit appele Magic Pad", Jan. 2, 2012, Publisher: http://www.isorg.fr/fr/rep-edito/ido-99/l_avenir_appartient_b_l_b_lectronique_imprimb_e.html, Published in: FR AEPI, "Agence d'Etude et de Promotion de l'Isere: 'ISORG a presente lors du Forum 41 une tablette interactive' (XP002674961)", "AEPI", Jun. 19, 2011, Publisher: URL: http://www.isorg.fr/rep-edito/ido-6l/isorg_a_prb_sentb_lors_du_forum_4i_une_tablette_interactive.htm, Published in: FR.

Christophe Premont, "Photo detectors and sensors designed to be flexible (XP002674972)", "Electronic Engineering Times Europe", Sep. 14, 2011, pp. 17-18, Publisher: URL:http:://www.isorg.fr/edito/files/photodectors_and_sensors_designed_to_be_flexible_798566.pdf, Published in: FR.

Marie Freebody, "New Materials Build Better Organic Photodetectors (XP002674974)", Aug. 9, 2011, pp. 1-3, Publisher: URL:http://www.isorg.fr/edito/files/new_materials_build_better_organic_photodetectors_174887.pdf, Published in: FR.

Laurent Marchandiau, "Isorg parie sur l'electronique organique imprimee, (XP002674975)", "Interview-Eco; L'essor", Sep. 12, 2011, Publisher: URL:http://www.lessor.fr/2011/09/12/interview-eco-isorg-parie-sur-1%E2%80%99electronique-organique-imprimee/, Published in: FR.

Laurent Jamet, Isorg, "Organic Photodetectors and Image Sensors, Highly Innovative Products for New Markets and Attractive Business Opportunities for the Printed Electronics Industry (XP0108151359)", "Printed Electronics and Photovoltaics, Europe IDTECHEX, UK", Apr. 6, 2011, pp. 1-17, Publisher: www.idtechex.com.events/presentations/organic-photodetectors-and-image-sensors-highly-innovative-products-for-new-markets-and-attractive-business-, Published in: UK.

V. Charcos Llorens, French Application No. 11/58611 Search Report, Apr. 27, 2012, Publisher: inpi, Published in: FR.

Related U.S. Appl. No. 13/569,379, NonFinal Office Action, Feb. 27, 2014, Publisher: USPTO, Published in: US.

Related U.S. Appl. No. 13/569,379, Patent Application (Specification & Claims), , Published in: US.

Officer: V. Charcos Llorens, International Patent Application No. PCT/FR2012/051863, International Search Report, Nov. 26, 2012, Publisher: PCT, Published in: FR.

Related U.S. Appl. No. 14/347,982, Patent Application (Specification and Claims), Published in: US.

Officer: V. Charcos Llorens, Related International Patent Application No. PCT/FR2012/051864, International Search Report, Nov. 26, 2012, Publisher: PCT, Published in: FR.

Laurent Jamet, Isorg, "The Next Big Wave in the Electronics Industry (XP002674899)", "Onboard Technology", Sep. 14, 2011, pp. 32-34, Publisher: Internet: URL:http://www.isorg.fr/edito/files/the_next_big_wave_in_the_electronics_industry_579453.pdf , Published in: FR.

Hoffner, Linh Nguyen, U.S. Appl. No. 13/569,379, Office Action Sep. 10, 2014, Publisher: USPTO, Published in: US.

Jean-Yves Laurent et al, "CEA-LITEN S2S printing platform for Organic CMOS and Sensors Devices", "Proceedings LOPE-C Conference 2011", Jun. 2011, Publisher: CEA-Liten Institute, Published in: Frankfurt.

Final Office Action dated Sep. 30, 2015, issued in co-pending U.S. Appl. No. 13/569,379.

Non-Final Office Action dated Oct. 21, 2015, issued in co-pending U.S. Appl. No. 14/347,982.

* cited by examiner

CONTACTLESS USER INTERFACE HAVING ORGANIC SEMICONDUCTOR COMPONENTS

BACKGROUND

The present disclosure relates to a user interface device, or man-machine interface.

DISCUSSION OF THE RELATED ART

User interface devices controllable by the simple sliding of a finger or of the hand on touch-sensitive surface, or touch surface, have already been provided. The touch surface may be superposed to a display screen, which enables to form an interactive user interface, or touch screen.

Touch screens and surfaces are currently used in many fields. As an example, they have already been used to control cell phones, computers, television sets, automobile vehicles, ticket machines, industrial equipment, medical equipment, etc.

A disadvantage of this type of interface is that the touch surface tends to very quickly get dirty at the contact of the users' fingers. This implies that a regular cleaning must be provided, in particular in case of a use in dirty environments (factories, public transports, etc.). Touch surfaces further raise a hygiene issue, in particular in hospitals where they can be a disease vector. Further, the operation of touch surfaces is generally altered when the user is wearing gloves. This may be a problem is certain fields of application (industry, surgery, outdoor use by cold weather, ski resort ticket machine, etc.).

Patent application US20080297487 describes the use of one or several proximity sensors in combination with a touch screen, to detect events such as the passing of an actuation member (finger, hand, object, etc.) above the screen. This enables the user to perform certain actions without having to touch the surface. The proximity sensors described in this document comprise at least one infrared emitter and at least one infrared receiver. In operation, the sensor permanently emits an infrared radiation. When a finger, a hand, or an object passes close to the sensor, part of the emitted infrared radiation is reflected towards the receiver, and the sensor deduces therefrom information relative to the presence of an object close to the touch surface.

A disadvantage of this type of device is the fact that the emission of the infrared radiation by the proximity sensors causes an unwanted excess power consumption.

It would be desirable to have a contactless user interface device capable of operating without emitting any radiation.

Further, devices such as touch surfaces, touch screens, and proximity sensors of the above-mentioned type have a relatively complex manufacturing.

It would be desirable to be able to more easily manufacture contactless touch surfaces and screens. It would further be desirable to be able to form such devices on all types of supports, and in particular on flexible supports such as plastic, paper, cardboard, or fabric, on large supports (advertising signs) or on disposable supports such as convenience product packages.

It has already been provided to form electronic components of transistor, light-emitting diode, and photodetector type, based on organic conductor and semiconductor materials. Such materials have the advantage of being easier to deposit and more resistant than inorganic conductor and semiconductor materials (for example, silicon) used in conventional technological processes.

The forming of organic semiconductor components however remains relatively complex. In particular, it is necessary to provide phases of low-pressure vapor deposition and anneal phases at relatively high temperatures, for example, above 250° C. As a result, such components can only be formed on particularly strong supports, and by means of relatively expensive equipment. Further, the juxtaposition of such components on large surfaces is difficult, since it is difficult (or excessively expensive) for deposition equipment to process large supports (for example, having a diameter greater than 30 cm).

It would further be desirable, for example, in the field of advertising or communications, to be able to form a display surface capable of displaying an animation and offering possibilities of interaction with a user.

SUMMARY

Thus, an object of an embodiment of the present invention is to provide a user interface device at least partly overcoming some of the disadvantages of existing devices.

According to a first aspect, an object of an embodiment of the present invention is to provide an interface device capable of being actuated with no contact with the user.

Another object of an embodiment of the present invention is to provide a contactless user interface device capable of operating without emitting any radiation.

According to a second aspect, an object of an embodiment of the present invention is to provide a user interface device based on organic conductor and semiconductor materials.

Another object of an embodiment of the present invention is to provide a user interface device which is easier to manufacture than known devices.

Another object of an embodiment of the present invention is to provide a user interface device that can be formed on a larger variety of supports than current devices and especially on low-cost supports such as plastic, paper, fabric, etc.

According to a third aspect, an object of an embodiment of the present invention is to provide an interactive display surface capable of being used for advertising or communications purposes.

Thus, an embodiment of the present invention provides a touch or contactless user interface device, comprising organic semiconductor components formed by deposition of organic conductor and semiconductor materials in liquid form on a dielectric support.

According to an embodiment of the present invention, the semiconductor components comprise a photon sensor array.

According to an embodiment of the present invention, the array is capable of detecting variations of the shadow of an actuation member and of deducing therefrom information representative of a variation of the position of the actuation member.

According to an embodiment of the present invention, this device is capable of deducing from the shadow variations information representative of a variation of the distance between the actuation member and the sensor array.

According to an embodiment of the present invention, this device is capable of deducing from the shadow variations information representative of a variation of the position of the actuation member parallel to the sensor array.

According to an embodiment of the present invention, this device has no optical system between the sensor array and the actuation member.

According to an embodiment of the present invention, a translucent protection structure coats the sensor array.

According to an embodiment of the present invention, the surface area of the sensor array is larger than the surface area of the actuation member in front of the array.

According to an embodiment of the present invention, the actuation member is at a distance greater than ten centimeters away from the sensor array.

According to an embodiment of the present invention, the dielectric support is made of a material from the group comprising glass, plastic, paper, cardboard, and fabric.

According to an embodiment of the present invention, the components are formed at a temperature lower than 150° C. and at atmospheric pressure.

According to an embodiment of the present invention, the semiconductor components comprise an array of light-emitting display pixels.

According to an embodiment of the present invention, the semiconductor components comprise an array of infrared emitters.

According to an embodiment of the present invention, the device further comprises a darkness sensor and means for activating the infrared emitters when the luminosity is below a threshold.

Another embodiment of the present invention provides an interactive display surface comprising an interface device of the above-mentioned type, this device comprising display means and at least one photosensitive presence sensor.

BRIEF DESCRIPTION OF THE DRAWINGS

The foregoing and other features and advantages of the present invention will be discussed in detail in the following non-limiting description of specific embodiments in connection with the accompanying drawings, among which.

DETAILED DESCRIPTION

Figure 1:
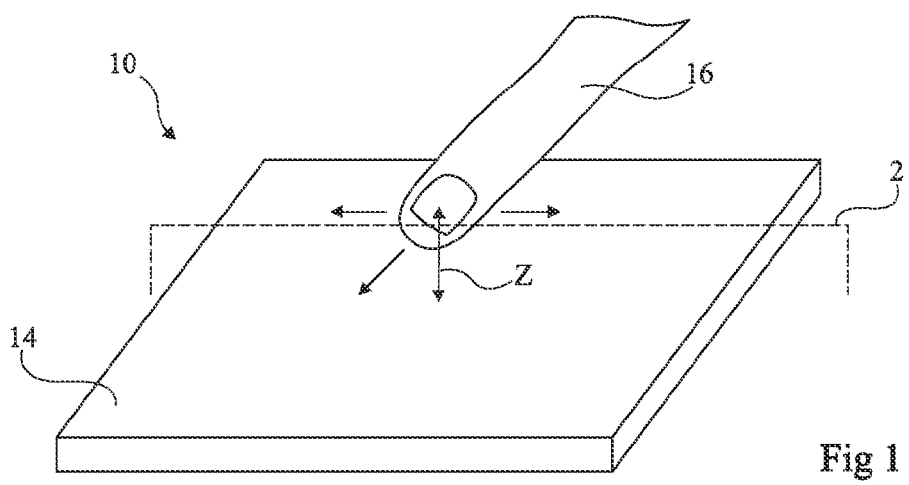
FIG. 1 is a perspective view schematically showing an embodiment of a user interface device.

For clarity, the same elements have been designated with the same reference numerals in the different drawings and, further, as usual in the representation of integrated circuits, the various drawings are not to scale. Further, only those elements which are useful to the understanding of the present invention have been shown and will be described. In particular, what use is made of the user interface devices described hereinafter has not been detailed. It will be within the abilities of those skilled in the art to use the provided device in any type of system capable of being controlled via a touch and/or contactless interface. Further, the means for processing the information provided by the user interface devices described hereinafter and the means of connection with the system(s) to be controlled are within the abilities of those skilled in the art and will not be described.

A first aspect of an embodiment of the present invention provides a user interface device comprising an array of photon sensors, capable of detecting variations of the shadow of an actuation member on an array of photon sensors or photodetectors, and of deducing therefrom information representative of a variation of the position of the actuation member.

It should be noted that "position of the actuation member" here means a relative position with respect to the interface device. A usage mode may especially be provided, where the actual user interface device is displaced, the actuation member remaining fixed.

Figure 2:
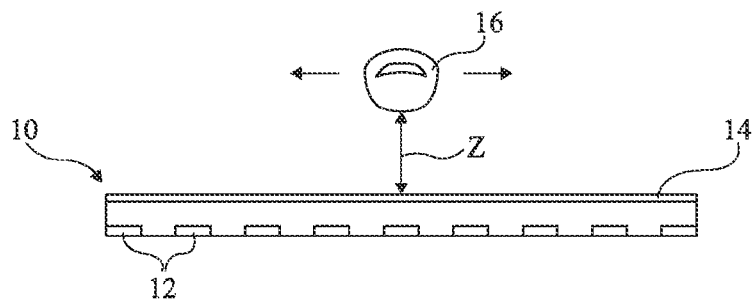
FIG. 2 is a cross-section view of the user interface device of FIG. 1.

FIGS. 1 and 2 schematically show an embodiment of a user interface device 10. FIG. 1 is a perspective view of device 10, and FIG. 2 is a cross-section view along plane 2 of FIG. 1.

Device 10 comprises an array of photon sensors or photodetectors 12 (FIG. 2). In this example, sensors 12 are arranged on a planar surface. Embodiments where sensors 12 are arranged on a non-planar surface may however be provided. Sensor array 12 may be topped with a transparent or translucent protective coating 14, for example, a glass plate or a plastic coating.

Device 10 is capable of detecting variations of the shadow cast by an actuation member 16 on sensor array 12, when the actuation member is arranged between a light source and the array.

Actuation member 16 may be the user's finger, hand, or any other object. The light source is preferably the ambient light, for example, the sun or the interior electric lighting of a room in a building.

In this example, actuation member 16 is directly placed in front of sensor array 12, that is, no optical system is provided between the array and the actuation member. The surface area taken up by the sensor array is preferably greater than the surface area of the projection of the actuation member in the plane of this array. More generally (in particular if sensor array 12 does not occupy a planar surface), the surface area of sensor array 12 is greater than the surface area of the actuation member opposite to this array.

In a preferred embodiment, device 10 is capable of detecting displacements of the actuation member in a plane parallel to the plane of sensor array 12, and variations of distance Z between the actuation member and sensor array 12.

To achieve this, in an initialization phase, device 10 measures the ambient luminosity, that is, the light intensity received by each sensor 12 when no actuation member is arranged in front of sensor array 12.

When actuation member 16 is placed between the light source and the sensor array, the cast shadow of the actuation member on the sensor array causes a decrease in the light intensity received by some of sensors 12. This enables device 10 to detect the presence of actuation member 16 close to the array and, possibly to follow the displacements of the actuation member in a plane parallel to the array plane (or parallel to the surface occupied by this array if this surface is not planar).

When distance Z between the actuation member and sensor array 12 varies, the light intensity level received by sensors 12 also varies. In particular, when actuation member 16 moves towards sensor 12, the light intensity received by sensors 12 under the shadow of the actuation member decreases, and when actuation member 16 moves away from the sensor array, the light intensity increases. Device 10 is capable of deducing, from the variations of the intensity of the cast shadow of the actuation member, information relative to the variations of distance Z between the actuation member and the sensor array. In an alternative embodiment, a calibration phase enabling to establish a correspondence between the intensity level of the cast shadow of the actuation member and the distance between the actuation member and sensors 12 may be provided. This enables device 10 to measure distance Z between the actuation member and sensors 12.

Thus, in a preferred embodiment, device 10 is capable of detecting the position in three dimensions of actuation member 16 in the space located in front of the sensor array.

Although this has not been shown in the drawings, device 10 may comprise means for processing the signals provided by sensors 12 (for example, a microprocessor), and means of communication with a device or a system to be controlled (wire or wireless connection).

Further, and although this has not been shown, each photodetector 12 may comprise a focusing lens, for example, a Fresnel lens. A lens array then forms an interface between the photosensitive region of photodetector array 12 and coating 14, or is integrated to coating 14. The provision of lenses enables to improve the lateral resolution of detection of the actuation member, especially when it is distant from device 10.

An advantage of interface device 10 described in relation with FIGS. 1 and 2 is that is can be actuated with no contact with the user. It should however be noted that device 10 may also operate as a touch surface, that is, if the user slides his finger on the upper surface of the device (upper surface of Protective coating 14 in this example), the device will be able to determine the position in two dimensions of the actuation member on the sliding surface (distance Z equal to the thickness of protective coating 14).

Another advantage of interface device 10 is that it enables to provide information relative to the distance between the actuation member and sensors 12. This for example enables to implement applications of control of virtual three-dimensional objects, or of three-dimensional navigation.

Another advantage of interface device 10 is that it does not require, for its operation, emitting an infrared radiation or the like, which enables to minimize its electric consumption.

In the above-described embodiment, the shadow of the actuation member, projected on the detection surface, is used to obtain information relative to the position of the actuation member. The image of the actuation member seen by the photon sensors may also be used. It should be noted that in practice, the cast shadow and the image of the actuation member do not coincide, except if the light source is placed exactly in the axis of the projection of the actuation member on the sensor array. As a variation, device 10 may detect both the cast shadow and the image of the actuation member to obtain more specific information relative to the position or to the variations of the position of the actuation member. Device 10 for example comprises a software for processing the signals provided by the photodetector array, capable of detecting the cast shadow and possibly the image of the actuation member.

In a preferred embodiment, device 10 is capable of operating (that is, of detecting the cast shadow of the actuation member) when actuation member 16 is located at a distance greater than 10 cm from the sensor array, for example, a distance ranging between 10 cm and 1 m.

Figure 3:
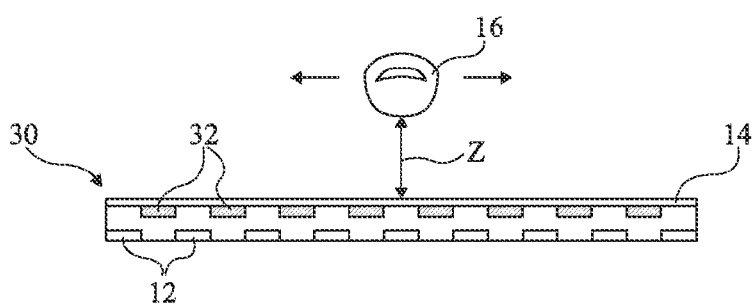
FIG. 3 is a cross-section view showing an alternative embodiment of a user interface device.

FIG. 3 is a cross-section view showing an alternative embodiment in which a user interface device 30 comprises a display screen, to form an interactive interface.

Device 30 of FIG. 3 comprises the same elements as device 10 of FIGS. 1 and 2, and further comprises an array of light-emitting (or backlighting) display pixels 32. In this example, pixels 32, for example, light-emitting diodes, are arranged in a plane parallel to photodetector array 12, and between the photodetector array and protective coating 14. Photodetector array 12 and pixel array 32 are stacked with a slight offset so that, in top view, pixels 32 are not in front of sensors 12, which would mask sensors 12 and would prevent the detection of the cast shadow of the actuation member.

In an alternative embodiment, photon sensor array 12 is placed between display pixel array 32 and protective coating 14. In this case, it may be provided to stack sensors 12 and pixels 32 with no offset, provided for sensors 12 to be made of transparent or translucent materials.

In another alternative embodiment, the detection and display arrays are not stacked, but are formed in a same level of the stack of conductor and semiconductor layers (alternation of pixels 32 and of sensors 12).

It should be noted that the display screen associated with interface device 30 is not necessarily a light-emitting diode screen, but may be made in any other adapted technology.

Further, in another alternative embodiment, the display screen is not stacked to the user interface device but is distant and connected to the interface device by a wire or wireless connection.

Figure 4:
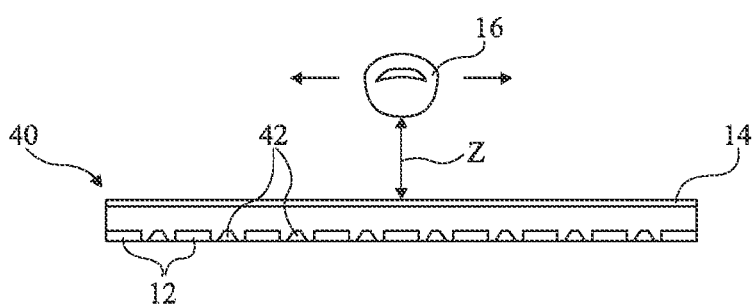
FIG. 4 is a cross-section view showing another alternative embodiment of a user interface device.

FIG. 4 is a cross-section view showing another alternative embodiment where a user interface device 40 comprises infrared proximity sensors. Device 40 of FIG. 4 comprises the same elements as device 10 of FIGS. 1 and 2, and further comprises an array of infrared emitters 42. In operation, each of emitters 42 permanently emits an infrared radiation. When actuation member 16 passes above an emitter 42, part of the emitted radiation is reflected towards a neighboring photodetector 12, which can deduce therefrom information relative to the presence of an object above the interface. Thus, infrared emitters 42, in combination with photodetectors 12, enable device 40 to implement the same functions of detection of the variations of the position of actuation member 16 as photodetectors 12 alone used as shadow sensors.

An advantage of infrared detection over shadow detection is that its operation is independent from the ambient lighting and thus more robust. In particular, infrared detection may operate in the dark, in the absence of any external light source. It may also be provided to alternate between a low-consumption operating mode, based on the detection of the cast shadow of the actuation member by photodetectors 12 when the ambient lighting makes it possible, and an infrared operating mode when the lighting conditions do not enable the cast shadow detection. A darkness sensor may for example be provided to automatically switch from the low-consumption mode to the infrared mode when the ambient luminosity becomes too low to enable the cast shadow detection.

An infrared emission (by emitters 42) with a frequency modulation may be provided, which enables, on reception by photodetectors 12, to discriminate shadow from infrared. This enables to simultaneously use the infrared operation and the cast shadow detection operation to obtain more accurate information relative to the position of the actuation member. Frequency modulation infrared emission further enables to decrease the consumption of the infrared source.

As in the example described in relation with FIG. 3, interface device 40 may be associated with a display screen, which is not shown in FIG. 4.

A second aspect of an embodiment of the present invention provides forming a user interface device based on organic conductor and semiconductor materials.

Figure 5A:
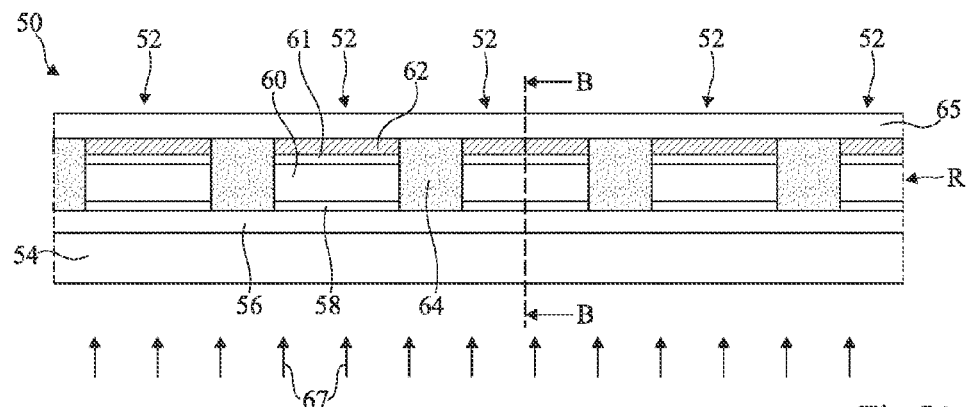
FIGS. 5A and 5B are cross-section views schematically and partially showing an embodiment of a user interface device based on organic conductor and semiconductor materials.
Figure 5B:
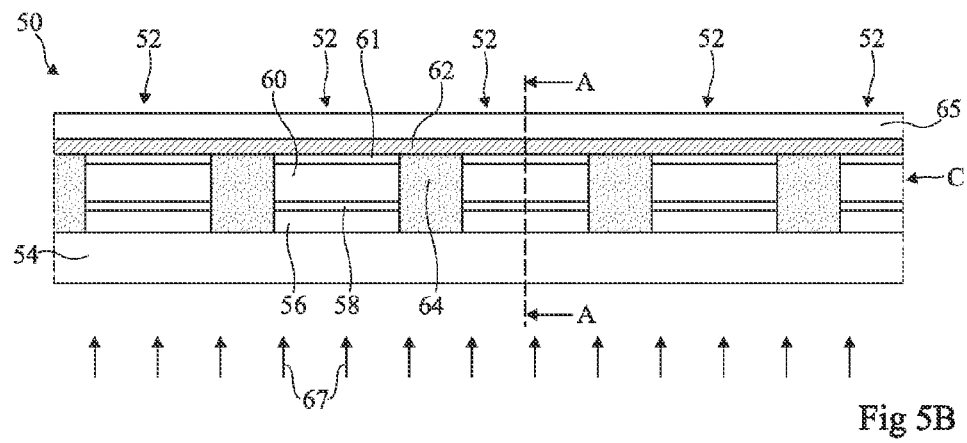

FIGS. 5A and 5B are cross-section views schematically and partially showing an embodiment of a user interface device 50 based on organic conductor and semiconductor materials. FIG. 5B is a cross-section view in plane B of FIG. 5A, and FIG. 5A is a cross-section view in plane A of FIG. 5B.

Device 50 comprises an array of photon sensors or photodetectors 52, preferably capable of detecting variations of the cast shadow of an actuation member (not shown in FIGS. 5A and 5B). In this example, photodetectors 52 are formed on a surface of a transparent or translucent dielectric support or substrate 54, for example, made of glass or plastic. Each photodetector 52 comprises a stack comprising, in the following order, starting from substrate 54: a transparent electrode 56, for example, made of indium tin oxide (ITO); a layer 58 of a heavily-doped transparent organic semiconductor polymer (electron donor layer), for example, a polymer known as PEDOT:PSS, which is a mixture of poly(3,4-ethylenedioxythiophene) and of sodium polystyrene sulfonate; a layer 60 of an organic semiconductor polymer, for example poly(3-hexylthiophene) or poly(3-hexylthiophene-2,5-diyl) (P-type semiconductor), known as P3HT, or methyl [6,6]-phenyl-C61-butanoate (N-type semiconductor), known as PCBM; a layer 61 of a heavily-doped organic semiconductor polymer (hole donor layer); and an electrode 62, for example, made of aluminum or silver. Lower electrodes 56 have, in top view, the shape of parallel strips, each strip 56 addressing all the photodetectors of a same line R (FIG. 5A) of the array. Upper electrodes 62 have, in top view, the shape of strips orthogonal to electrodes 56, each strip 62 addressing all the photodetectors of a same column C (FIG. 5B) of the array. In this example, lower electrode layer 56 extends continuously under each row R of photodetectors 52 of the array, and upper electrode 62 extends continuously on each column C of photodetectors 52 of the array. Laterally, semiconductor regions 60 of photodetectors 52 are separated from one another by a dielectric material 64. Further, a transparent protective coating 65 covers the upper surface of the array (on the side of electrodes 62).

In this example, photodetectors 52 are intended to be illuminated through transparent substrate 54 (and through transparent layers 56 and 58). In FIGS. 5A and 5B, the incident radiation is represented by arrows 67, on the side of substrate 54.

Figure 6:
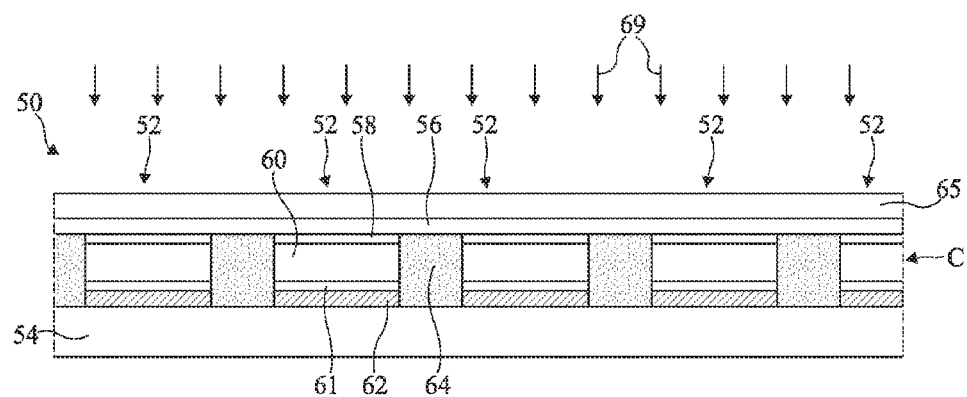
FIG. 6 is a cross-section view schematically and partially showing an alternative embodiment of the device of FIGS. 5A and 5B.

FIG. 6 is a cross-section view schematically and partially showing an alternative embodiment of device 50 of FIGS. 5A and 5B. The device of FIG. 6 differs from the device of FIGS. 5A and 5B in that the order of the layers of photodetectors 52 is inverted. FIG. 6 is a cross-section view along a column C of photodetectors. The corresponding cross-section (along a row) has not been shown.

In this example, each photodetector 52 comprises a stack comprising, in the following order, starting from substrate 54, an electrode 62, for example, made of aluminum or silver, a layer 61 of a heavily-doped organic polymer (hole donor layer), a layer 60 of an organic semiconductor polymer, a layer 58 or a heavily-doped transparent semiconductor polymer (electron donor layer), and a transparent electrode 56. A transparent protective coating 65 covers the upper surface of the array (on the side of electrodes 56).

Photodetectors 52 are here intended to be illuminated through protective coating 65 (and through transparent layers 56 and 58). In FIG. 6, the incident radiation is represented by arrows 69, on the side of transparent coating 65.

It is here provided to form device 50 with printing techniques. The materials of above-mentioned layers 56 to 65 are deposited in liquid form, for example, in the form of conductor and semiconductor inks by means of inkjet printers. It should be noted that "materials in liquid form" also designates gel materials chat can be deposited by printing techniques. Anneal steps may possibly be provided between the depositions of the different layers, but the anneal temperatures cannot exceed 150° C., and the deposition and the possible anneals can be performed at the atmospheric pressure.

The forming of organic semiconductor components by printing techniques is for example described in article "CEA-LITEN S2S printing platform for Organic CMOS and Sensors Devices" by Jean-Yves Laurent et al, LOPE-C Conference, June 2011, Frankfurt.

An advantage of device 50 is that it can be more easily manufactured than existing devices. In particular, it may be formed on a greater variety of surfaces, and especially on larger surfaces and on any type of substrate, including on substrates with no resistance to heat, for example on flexible substrates made of plastic, paper, cardboard, fabric, etc. It should be noted that in the device of FIGS. 5A and 5B, if the substrate is opaque, it may be provided to form upper electrode 62 in a transparent conductor material, and to illuminate the device through the upper surface (in the orientation of the drawing).

Further, device 50 may be formed by using equipment (printing deposition equipment) compatible with equipment for industrial package manufacturing, plastic engineering, etc.

Another advantage of device 50 is that its cost is relatively low, since the equipment necessary to form it (printing deposition equipment) is less expensive than the equipment necessary to form inorganic semiconductor devices, and also less expensive than usual equipment used to form organic semiconductor components (low-pressure deposition and high-temperature anneal equipment).

Various alterations, modifications, and improvements will readily occur to those skilled in the art. In particular, it will be within the abilities of those skilled in the art to provide any adapted stack of layers, other than those described in relation with FIGS. 5A, 5B, and 6, to form a photodetector. It may especially use other conductor, semiconductor, and dielectric materials capable of being deposited in liquid form, than those mentioned hereabove.

It is more generally provided to form touch or contactless user interface devices, in which semiconductor components are formed by deposition of liquid organic conductor and semiconductor materials on a dielectric support. In addition to the photodetector array, it may also be provided to form, by printing of organic materials, a display array (see FIG. 3) or infrared proximity sensors (see FIG. 4). The present invention is particularly advantageous in a preferred application to devices of the type described in relation with FIGS. 1 to 4.

Further, although this has not been mentioned hereabove, one or several access transistors may be provided to be associated with each photodetector in the photodetector array (active array). The transistors may also be formed from organic semiconductor materials in liquid or gel form, by printing techniques.

A third aspect of an embodiment of the present invention provides an interactive display surface capable of being used, for example, for advertising or communication purposes.

Figure 7:
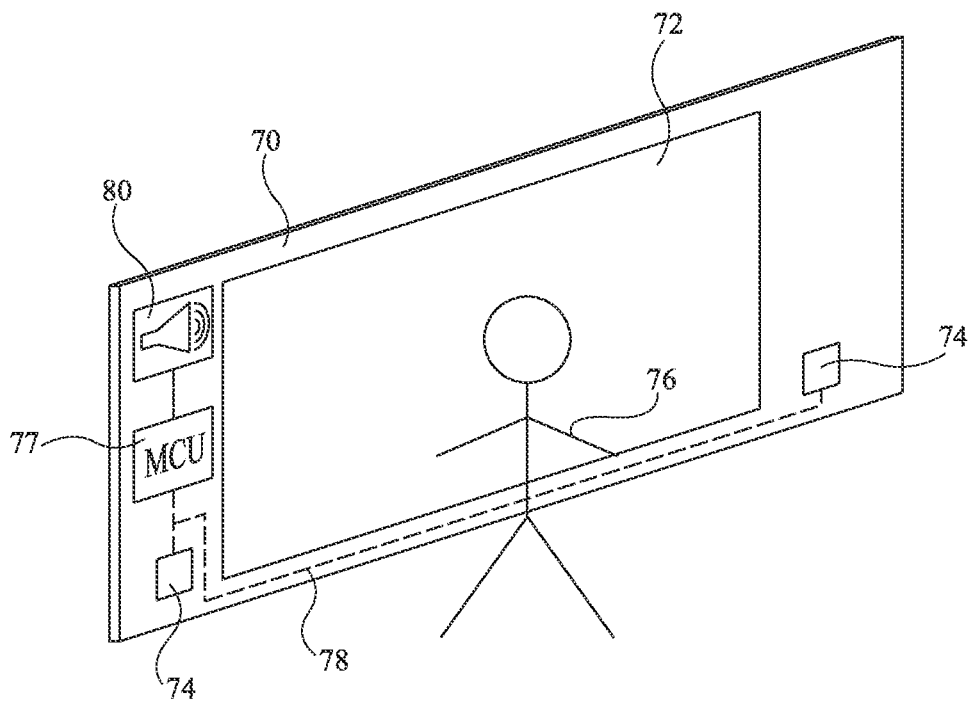
FIG. 7 schematically shows an embodiment of an interactive display surface capable of being used for advertising purposes.

FIG. 7 is a perspective view schematically showing an embodiment of an interactive display surface 70.

Surface 70 comprises a display area (or screen) 72. The display area is preferably relatively large. Preferably, area 72 extends across a surface area greater than 3 $m^2$. Display area 72 is formed by deposition of organic conductor and semiconductor materials in liquid form on a dielectric support by printing techniques. As an example, surface 70 is formed on a paper or plastic poster, on a glass shop window, on cardboard or on fabric, etc. Such supports may form the dielectric support on which display area 72 is printed. If needed, a dielectric interface layer may be deposited by printing on the support, for example, if the support is porous or does not have satisfactory dielectric properties. Display area 72 for example is an organic light-emitting diode screen. The forming of organic light-emitting diodes by printing techniques is for example described in above-mentioned article "CEA-LITEN S2S printing platform for Organic CMOS and Sensors Devices". More generally, display area 72 may be formed in any other technology enabling to form a display screen by deposition of organic conductor, semiconductor, and dielectric materials. As an example, area 72 may be formed from light-emitting organic materials.

Surface 70 comprises at least one photosensitive presence sensor 74 (two sensors 74 in the shown example). In this example, surface 70 is formed on a glass shop window, and detectors 74 are placed towards different ends of the window (lower left-hand side and lower right-hand side), and are capable of delivering a signal when a passer-by 76 (user) or an object is in front of one or the other of these ends, in the detector field. Detector 74 may be a simple photodiode or photoresistor, an infrared proximity sensor, an array of photon sensors of the type described in relation with FIGS. 1 to 6, or any other photosensitive detector. In all cases, sensors 74 are formed by deposition of organic conductor and semiconductor materials in liquid form on a dielectric support by printing techniques.

A control unit 77 is provided to control display area 72 and have it display an animation (for example, an image, a slideshow, or a video), or, more generally, information when sensors 74 sense the presence of a user in front of the window. Control unit 77 may be formed by discrete electronic components, or by integrated circuits (unit 77 for example comprises a microcontroller). Control unit 77 may be placed on surface 70, for example by gluing or embedding, or separated and housed in a package external to surface 70. As a variation, control unit 77 may, like display area 72 and photosensitive sensors 74, be made of printed organic electronics, directly on surface 70. Connections 78 between control unit 77, display area 72, and detectors 74, may be wired or wireless. Conductive tracks of a transparent conductor material capable of being deposited in liquid form may for example be printed on surface 70.

The shown example further provides a sound emitting device 80, for example comprising one or several loudspeakers. This enables to provide, in addition to the visual animation displayed on display area 72, a sound animation. The sound device may be made in any known technology, for example, based on piezoelectric materials. Device 80 may be placed on surface 70, for example by gluing or embedding, or be external to surface 70. In a preferred embodiment, device 80 is made of materials capable of being deposited in liquid form (for example comprising an organic piezoelectric material) and directly formed on surface 70 by printing techniques.

For its power supply, interactive surface 70 may be connected to a power distribution network (such as the mains) or to a battery. If the electric power needs of surface 70 are not too strong, a battery made of materials capable of being deposited in liquid form, directly printed on surface 70, may be used.

As an example of use, it may be provided to form an advertising device comprising a large contactless interactive surface (for example, on the order of several square meters), capable of starting the display of an animation as soon as a person (user) passes by the surface.

In an alternative embodiment, several presence sensors 74 may be provided at different points of surface 70. The control unit can then be programmed to vary the animation according to the user's position in front of the surface (multiple startings).

In another variation of the present invention, an array of photodetectors of the type described in relation with FIGS. 1 to 6 may be superposed to display area 72. The photodetector array then plays the role of presence sensors 74. Such an embodiment enables to implement an interactive animation, that is, reacting to the user's actions (displacements, changes of position, moving towards or away from the surface, etc.).

Various embodiments have been described, various alterations and modifications will occur to those skilled in the art.

In particular, the interactive display surface described in relation with FIG. 7 may be used in other applications than the animation of a shop window. More generally, such an interactive display surface may be used for any type of advertising or communications application. It will for example be within the abilities of those skilled in the art to adapt the provided operation to form interactive packages for commercial products (food or others).

The practical implementation of the present invention is within the abilities of those skilled in the art based on the functional indications given hereabove and using technologies known per se.

The invention claimed is:

1. A touch or contactless user interface device, comprising:
   organic semiconductor components formed by deposition of organic conductor and semiconductor materials in liquid form on a dielectric support, said semiconductor components comprising an array of infrared emitters and an array of photon sensors; and
   a darkness sensor and means for activating the infrared emitters when the luminosity is below a threshold;
   wherein said array of photon sensors is capable of detecting variations of the shadow of an actuation member and of deducing therefrom information representative of a variation of the position of the actuation member.

2. The device of claim 1, capable of deducing from said shadow variations information representative of a variation of the distance between the actuation member and the sensor array.

3. The device of claim 1, capable of deducing from said shadow variations information representative of a variation of the position of the actuation member parallel to the sensor array.

4. The device of claim 1, having no optical system between the sensor array and the actuation member.

5. The device of claim 1, wherein a translucent protection layer coats the sensor array.

6. The device of claim 1, wherein the surface of the sensor array is higher than the surface of the actuation member in front of said array.

7. The device of claim 1, wherein the actuation member is at a distance greater than ten centimeters away from the sensor array.

8. The device of claim 1, wherein the dielectric support is made of a material from the group comprising glass, plastic, paper, cardboard, and fabric.

9. The device of claim 1, wherein said components are formed at a temperature smaller than 150° C. and at atmospheric pressure.

10. The device of claim 1, wherein said semiconductor components comprise a light-emitting display pixel array.

11. The device of claim 1, further comprising a darkness sensor and means for activating the infrared emitters when the luminosity is below a threshold.

12. An interactive display surface comprising the device of claim 1, said device comprising display means and at least one photosensitive presence sensor.

* * * * *